United States Patent
Johnson

[11] 3,887,800
[45] June 3, 1975

[54] PERSONAL CARE VIEWER

[75] Inventor: Dee Lynn Johnson, Woodbury, Minn.

[73] Assignee: Minnesota Mining and Manufacturing Company, St. Paul, Minn.

[22] Filed: Dec. 19, 1973

[21] Appl. No.: 426,119

[52] U.S. Cl. ............... 240/1 EL; 240/4.2; 240/6.45; 350/201; 350/202
[51] Int. Cl. ........................................................ F21
[58] Field of Search ........... 240/6.4, 6.45, 4.2, 2.18, 240/1 EL; 350/201, 202, 199

[56] References Cited
UNITED STATES PATENTS

| | | | |
|---|---|---|---|
| 1,578,907 | 3/1926 | Naumburg | 350/201 UX |
| 1,979,542 | 11/1934 | Hauser et al. | 240/4.2 |
| 2,461,315 | 2/1949 | Virgilis | 240/4.2 |
| 3,171,885 | 3/1965 | Moody | 350/201 |
| 3,267,806 | 8/1966 | Azegami | 350/201 UX |
| 3,435,199 | 3/1969 | Ely | 240/4.2 |
| 3,459,178 | 8/1969 | Fleming | 240/6.4 R X |
| 3,591,792 | 7/1971 | Soltan | 240/4.2 |
| 3,598,987 | 8/1971 | Kipping | 240/1 EL |
| 3,677,620 | 7/1972 | Bettencourt | 350/202 UX |
| 3,699,915 | 10/1972 | Greene | 240/1 EL |

*Primary Examiner*—Richard A. Wintercorn
*Attorney, Agent, or Firm*—Alexander, Sell, Steldt & DeLaHunt

[57] ABSTRACT

A personal care viewing device is provided comprising a positive catadioptric element having a defined focal length. Preferred embodiments employ a light source and a light guide for directing light from the light source to the front side of the catadioptric element in a diffuse pattern.

13 Claims, 10 Drawing Figures

PATENTED JUN 3 1975 3,887,800

SHEET 1

PERSONAL CARE VIEWER

BACKGROUND OF THE INVENTION

1. Field of the Invention:

This invention relates to personal care viewing devices.

2. Description of the Prior Art:

There has always been a need for a personal care viewing device which is inexpensive and can be conveniently carried on the person for immediate use at any time. There has also been a need for a viewing device which provides soft illumination and sufficient magnification to enable detailed examination without undue glare.

Although there has always been an ongoing need for a personal care viewing device having such characteristics, and despite the development of a myriad of viewing devices by others, the prior art viewing devices suffer from a number of inherent deficiencies. For example, U.S. Pat. Nos. 2,224,259; 2,789,207; and 2,943,184 describe simple flat or planar mirrors to which are attached, e.g., flashlights. Such devices have the inherent disadvantages of providing direct lighting (with consequent harmful glare) and lack of magnification of the area to be viewed. A slightly modified device for examination of the mouth is described in U.S. Pat. No. 3,459,178. Although this device might provide for illumination and magnification of one's mouth, the area to be viewed is nevertheless directly lighted and the device is not sufficiently compact or portable to permit its being carried on the person. Furthermore, an attempt to use the device for viewing one's eyes, or adjacent areas, would result in harmful glare.

Others have developed various devices involving a combination of lights and flat or planar mirrors which do not provide for magnification of the image to be viewed and are not generally compact, portable devices of the type desired. See for example, U.S. Pat. Nos. 1,495,625; 1,667,545; 1,850,219; and 1,979,542. Similarly, flat mirrors used in make-up kits have their disadvantages (e.g., U.S. Pat. No. 3,737,216).

Other devices such as described in U.S. Pat. Nos. 1,589,576; 2,330,485; 1,898,791 also have limited use because of their particular design. Other devices of limited use for personal care viewing are described in U.S. Pat. Nos. 1,664,953; 2,652,480; and 3,066,569.

THE PRESENT INVENTION

The personal care viewing device of the present invention is useful under ordinary ambient lighting. Preferred embodiments have contained light sources which make such devices useful under all lighting conditions.

The present invention comprises a positive catadioptric element (i.e., a positive refractive lens element having a reflective surface). The catadioptric element may have an unfolded focal length as short as 50 mm, in which case the device can be held about 25 mm from the eye during use. On the other hand, its unfolded focal length can be as large as 500 mm in order to permit one to view a reasonably large area around the eye or other parts of the face.

Because one may wish to use the device in the dark or under conditions of poor lighting, it is preferred to mount the catadioptric element in a light guide preferably made of transparent plastic material into which a lamp or light source may be inserted behind such element. The light guide serves to direct light from the lamp beyond the periphery of the catadioptric element in a diffuse pattern into the space adjacent to the viewing side of the element. Optimum illumination is achieved if the light is directed in such a manner as to be primarily converging at the focal plane of the catadioptric element.

In another preferred embodiment, the light guide is removably attached to a housing containing a small battery-powered light bulb. In another preferred embodiment, the light guide is attached to a variable intensity electric lamp. In another aspect, the catadioptric element, without the light guide can be mounted on a flat handle or on jewelry (e.g., a ring or broach).

The personal care viewing device of the present invention is especially useful for locating or positioning a contact lens in one's eye, detecting foreign material in or around one's eye, observing ocular abrasion, and applying medication or cosmetics in or around the eye. The device is especially useful for people whose eyes have lost their ability to focus on a near object, and as an educational tool useful for ophthamologists and others in showing patients maladies in their own eyes.

The invention will be described in more detail hereinafter with reference to the accompanying drawings wherein like reference characters refer to the same parts throughout and in which.

Figure 1:
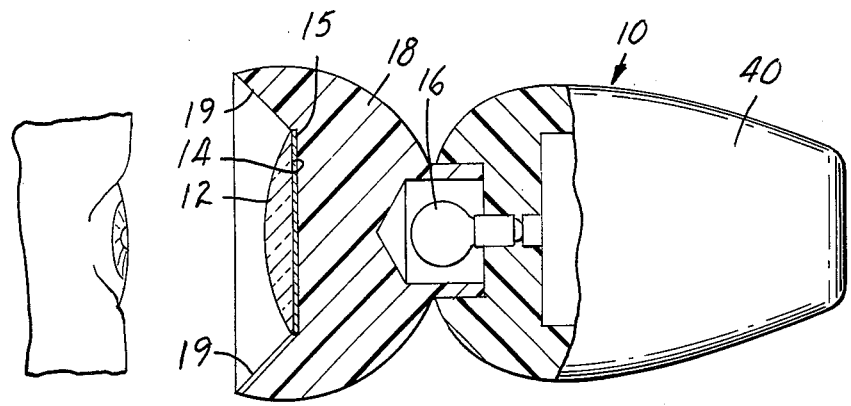
FIG. 1 is a cut-away view of a preferred viewing device.

In FIG. 1 there is shown a preferred personal care viewing device 10 comprising a positive catadioptric element 12 whose back surface 14 is adapted to reflect light through lens element 12. Device 10 further comprises light source 16 which preferably is a light bulb powered by a battery and which is positioned behind the back surface of element 12. Viewing device 10 further comprises light guide 18 for directing light from the light source beyond the periphery of the catadioptric element in a diffuse pattern into the space adjacent to the front side of element 12.

Element 12 as shown in FIG. 1 comprises a plano-convex lens having an unfolded focal length of 50 to 500 mm., for proper magnification of the image to be viewed. The back surface 14 of the lens is adapted to reflect light through the lens element by means of layer 15. Layer 15 preferably comprises a thin reflective metal coating (e.g., approximately 250–500 Angs.) applied to surface 14 (e.g., by vapor deposition, electroless deposition or sputtering), although layer 15 may also be provided by a thin plastic film (e.g., polyolefin, polyester) having at least one surface thereof thinly coated with a reflective metallic coating. Preferred metallic coatings for making reflective coatings comprise aluminum, chromium, silver, nickel, and stainless steel.

The diameter of the lens may vary. For example, large diameter lenses (e.g., 100 mm) enable one to view a considerable area around the eye, whereas smaller lenses (e.g., 10 mm) with commensurately shorter focal lengths are suitable for mounting on jewelry.

Figure 3:
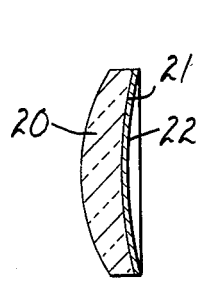
FIG. 3 is one lens element useful in the invention.
Figure 4:
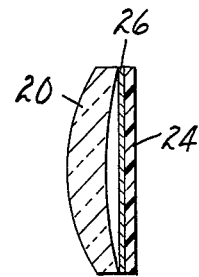
FIGS. 4 through 7 show still other catadioptric elements useful in the invention.

Other types of positive refractive lenses may also be used in the present invention. For example, in FIG. 3 there is shown a positive catadioptric element comprising converging meniscus lens 20 whose back surface 21 is adapted to reflect light through the lens by means of thin reflective metallic coating 22. In FIG. 4 the back surface of lens 20 is adapted to reflect light therethrough by means of plastic film 24 which bears a thin reflective metal coating 26.

Figures 5, 6:
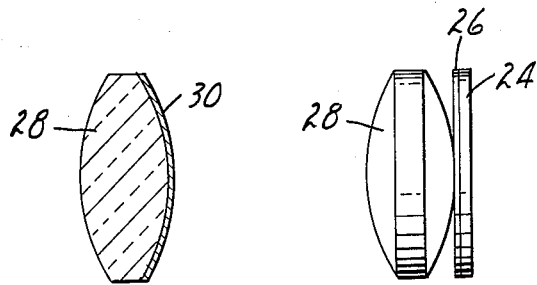

In FIG. 5 there is shown a catadioptric element comprising biconvex lens 28 whose back surface is adapted to reflect light through the lens by means of metallic coating 30. In FIG. 6 lens 28 is positioned next to plastic film 24 bearing a metallic coating 26 in order to obtain reflectance of light through the lens 28.

In accordance with the present invention it is not necessary for the catadioptric element to consist of only one refractive component. For example, two or more lenses may be aligned with respect to each other in such a manner that the effect thereof approximates that provided by a single positive refractive lens having an unfolded focal length of 50 to 500 mm. Accordingly, the term "catadioptric element" as used herein is meant to include combinations of lenses whose overall effect is the same as that afforded by a single lens. For example, in FIG. 7 there is illustrated a combination of lenses 32 and 34, the reflective surface being provided by coating 36.

Figure 2:
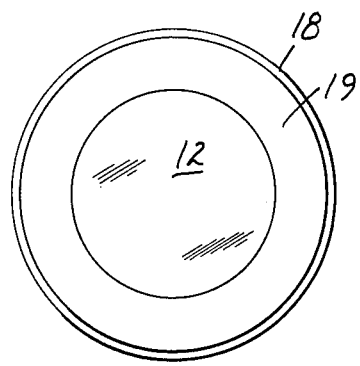
FIG. 2 is a front view of the viewing device of FIG. 1.

Light guide 18, e.g., as shown in FIGS. 1 and 2, is constructed of any suitable light conducting substance such as plastic or glass, but preferably plastic, such as acrylic, polycarbonate, cellulose acetate butyrate, polystyrene, or the like.

Figure 7:
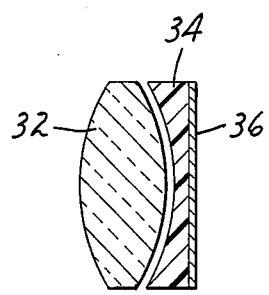

Preferably a portion of the light guide projects beyond the periphery of the lens in such a manner that light from the light source is primarily directed toward the focal plane of the catadioptric element in such a manner as to maximize illumination at the center of the field. It is also preferable for the light guide to be adapted to receive the light source (e.g., as shown in FIG. 7). It is even more preferable for the light guide to be adapted to be removably attached to housing 40 containing the light source.

Figure 9:
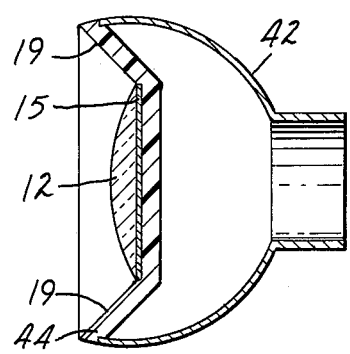
FIG. 9 is a cross-sectional view of another light guide useful in the present invention.

The light guide is adapted to emit diffuse light into the space adjacent to the front surface of the catadioptric element. This may be accomplished by providing surface roughness on portions 19 of the light guide which extend beyond the periphery of the catadioptric element. This may also be accomplished by providing light diffusing panels or plates 44 over those projecting portions of the light guide as shown in FIG. 9 (wherein the light guide 42 is a reflectorized shell).

Figure 8:
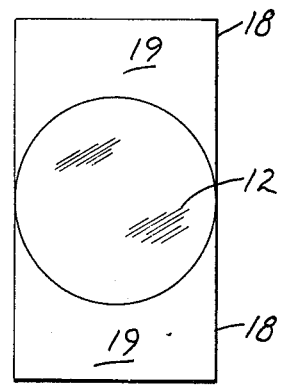
FIG. 8 is a front view of another viewing device.

The cross-sectional shape of the light guide or the catadioptric element need not be annular as shown in FIG. 2. For example, the light guide may only project beyond the periphery of the catadioptric element at certain points (e.g., as shown in FIG. 8). Similarly, the catadioptric element may be of non-circular configuration.

Figure 10:
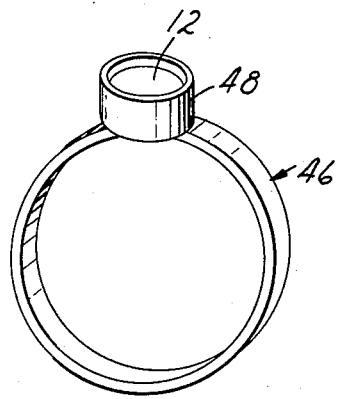
FIG. 10 is a ring having mounted therein a catadioptric element.

Although preferred personal care viewing devices of this invention comprise a light source and light guide in combination with the catadioptric element, the catadioptric element by itself can be an effective viewing device and can be mounted on a variety of substrates. For example, the catadioptric element can be mounted on a handle, a ring (as shown in FIG. 10 where element 12 is mounted on ring 46 by means of a metal band 48), a broach or other jewelry.

What is claimed is:

1. A personal care viewing device comprising:
   a. a positive catadioptric element having front and back reflecting surfaces, said catadioptric element having an unfolded focal length of 50 to 500 mm;
   b. a light source positioned behind said back reflecting surface of said catadioptric element; and
   c. a light guide surrounding said catadioptric element adapted to direct light from said light source beyond the periphery of said catadioptric element and from said back reflecting surface in a diffuse pattern into the space adjacent to said front surface of said catadioptric element.

2. A personal care viewing device in accordance with claim 1, wherein said back surface comprises a thin layer of reflective metallic material.

3. A personal care viewing device in accordance with claim 1, wherein said back surface comprises a thin plastic film bearing a reflective metallic coating.

4. A personal care viewing device in accordance with claim 1, wherein said catadioptric element comprises a plano-convex lens and a reflective surface.

5. A personal care viewing device in accordance with claim 1, wherein said catadioptric element comprises a biconvex lens and a reflective surface.

6. A personal care viewing device in accordance with claim 1, wherein said light guide comprises transparent plastic material and includes a mounting for said catadioptric element.

7. A personal care viewing device in accordance with claim 6, wherein said plastic light guide is adapted to receive said light source.

8. A personal care viewing device in accordance with claim 1, wherein said light guide comprises a reflectorized shell adapted to receive said light source.

9. A personal care viewing device in accordance with claim 1, wherein the directed light is primarily converging at the focal plane of the catadioptric element.

10. A personal care viewing device in accordance with claim 6, wherein said plastic light guide is adapted to be removably attached to a housing containing said light source.

11. A personal care viewing device in accordance with claim 1, wherein said light source comprises a bulb electrically connected to a battery.

12. A personal care viewing device in accordance with claim 1, wherein said light source comprises a bulb electrically connected to a variable intensity lamp.

13. A personal care viewing device in accordance with claim 1, wherein said catadioptric element comprises more than one refractive lens in combination with a reflective surface.

\* \* \* \* \*

UNITED STATES PATENT OFFICE
CERTIFICATE OF CORRECTION

PATENT NO. : 3,887,800
DATED : June 3, 1975
INVENTOR(S) : Dee Lynn Johnson

It is certified that error appears in the above-identified patent and that said Letters Patent are hereby corrected as shown below:

Col. 3, line 45, "FIG. 7" should read -- FIG. 1 -- .

Signed and Sealed this nineteenth Day of August 1975

[SEAL]

Attest:

RUTH C. MASON
Attesting Officer

C. MARSHALL DANN
Commissioner of Patents and Trademarks